(12) United States Patent
Sundkvist

(10) Patent No.: US 6,342,189 B1
(45) Date of Patent: Jan. 29, 2002

(54) METHOD FOR TOTAL PRECIPITATION OF VALUABLE METALS FROM AN ACID LEACHING SOLUTION

(75) Inventor: Jan-Eric Sundkvist, Skellefteå (SE)

(73) Assignee: Boliden Mineral, AB (SE)

( * ) Notice: Subject to any disclaimer, the term of this patent is extended or adjusted under 35 U.S.C. 154(b) by 0 days.

(21) Appl. No.: 09/568,248

(22) Filed: May 9, 2000

(30) Foreign Application Priority Data

Jun. 17, 1999 (SE) .............................................. 9902289

(51) Int. Cl.⁷ ................................................. C01G 1/00
(52) U.S. Cl. .............................. 423/1; 423/42; 423/43; 423/87; 423/104; 423/140
(58) Field of Search ............................... 423/1, 43, 42, 423/104, 140, 87

(56) References Cited

U.S. PATENT DOCUMENTS

| | | | |
|---|---|---|---|
| 4,006,080 A | 2/1977 | Twist et al. | 210/45 |
| 4,437,953 A | 3/1984 | Newman et al. | 204/119 |
| 4,594,102 A | 6/1986 | Weir et al. | 75/119 |
| 4,808,406 A | * 2/1989 | Brinkman | 424/140 |
| 5,427,691 A | 6/1995 | Kuyucak et al. | 210/713 |
| 5,954,969 A | * 9/1999 | Hedin | 210/709 |

FOREIGN PATENT DOCUMENTS

| | | |
|---|---|---|
| BE | 894 733 | 4/1983 |
| DD | 291 346 A5 | 6/1991 |
| EP | 0622338 B1 | 11/1994 |
| FR | 2 307 043 | 11/1976 |
| JP | 60-159134 A | 8/1985 |
| JP | 60161331 A | 8/1985 |
| WO | WO89/09289 | 10/1989 |

OTHER PUBLICATIONS

Sandström et al, "Bio–oxidation of a complex zinc sulphide ore: A study performed in continuous bench–and pilot scale", Proceed Biomine Int. Conf., Sydney 1997, pp. M1.1.1 to M1.1.11

* cited by examiner

Primary Examiner—Wayne Langel
Assistant Examiner—Timothy C Vanoy
(74) Attorney, Agent, or Firm—Burns, Doane, Swecker & Mathis, L.L.P.

(57) ABSTRACT

A method for the total precipitation of valuable metals, such as copper, nickel, zinc, cobalt, etc., from a leaching solution that has been acidified with sulphuric acid and that is substantially free from impurities, by neutralizing the solution with lime and/or limestone. Neutralization is effected in at least two stages, wherewith only partial precipitation is effected in the first stage, and wherewith full precipitation of remaining valuable metal content is effected in the last stage, by adding a surplus of neutralization agent. Slurry containing precipitates and remaining solid neutralization agent formed in the last stage in the neutralization process is returned to the first neutralization stage, possibly after re-dissolving the slurry in the incoming acid leaching solution. The amount of slurry returned together with any further neutralizing agent added promotes the partial precipitation of the valuable metal content. Metal hydroxide/gypsum precipitate, free from neutralizing agent and formed in the first stage, is washed and then removed from the process for winning metal therefrom.

18 Claims, 1 Drawing Sheet

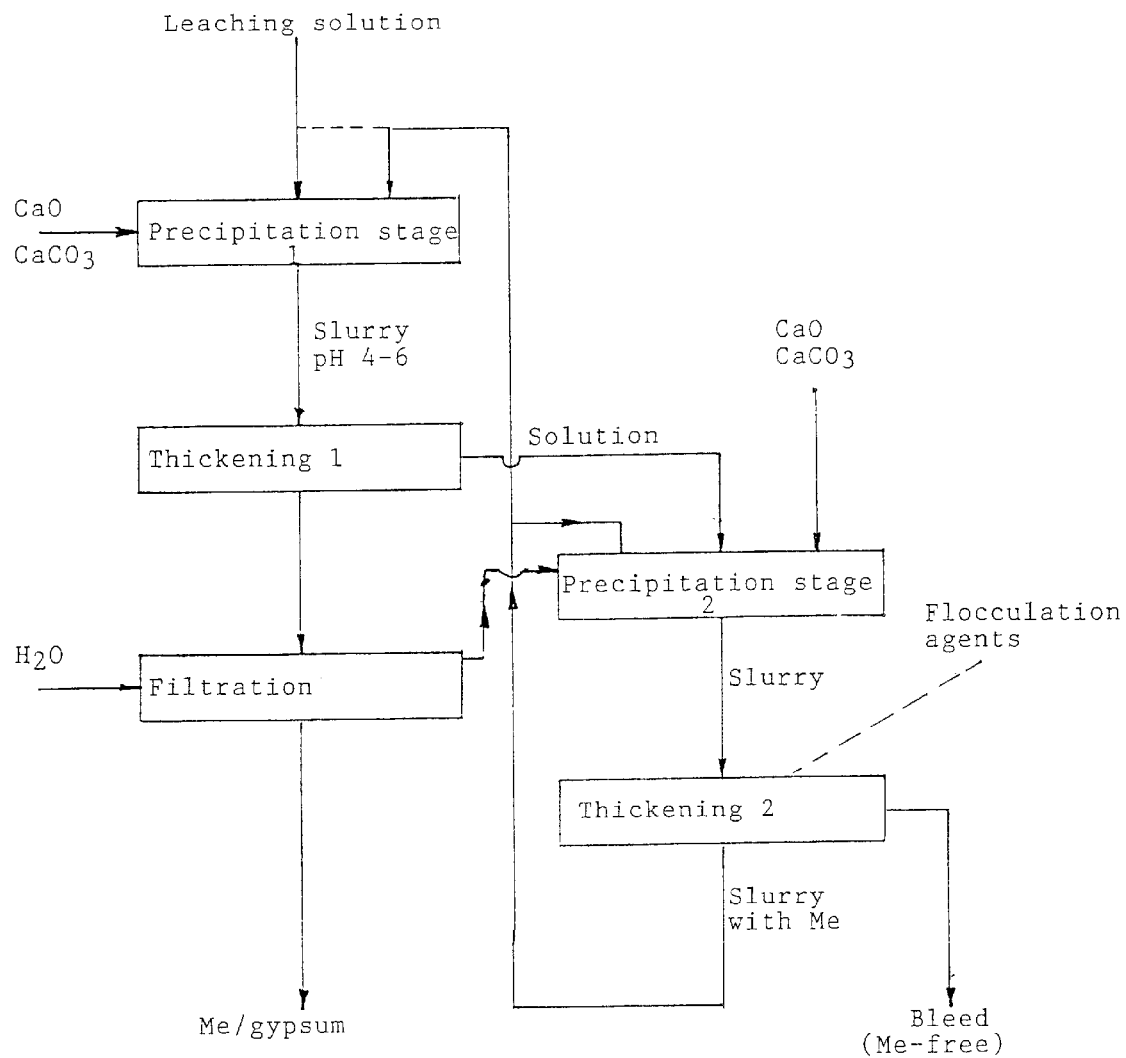
Fig.

METHOD FOR TOTAL PRECIPITATION OF VALUABLE METALS FROM AN ACID LEACHING SOLUTION

BACKGROUND OF THE INVENTION

The present invention relates to a method for the total precipitation of valuable metals from a leaching solution acified by sulphuric acid and which solution is essentially free from impurities and contaminants, by neutralising the solution with lime and/or limestone. The invention can be applied in particular with leaching solutions obtained in bioleaching processes, although it is not restricted to such leaching solutions.

In the total precipitation of valuable metals and contaminant metals from an acid leaching solution obtained when processing hydrometallurgically ores and other raw materials and intermediate products that contain valuable metals, by neutralisation with lime or limestone, it is necessary in known processes to use a given surplus of the neutralisation agent in order to obtain a satisfactory precipitation kinetic and thus achieve a sufficiently rapid precipitation rate. A lime surplus has been found to result in highly effective separation of metal and arsenic impurities for instance, as described in EP-B-0622338.

In respect of bioleaching processes for winning zinc from an iron-free solution, it is suggested in an article by Sandstrom et al (IBS '97 Proceed. Biomine Int. Conf., Sydney 1997) that an upconcentration of the zinc content by total precipitation is effected by neutralisation, whereafter the zinc content is won from the precipitate by an electrowinning process via leaching with return acid from the electrolysis circuit. However, it is not possible to use a lime surplus in such a process, since this would require an external addition of sulphuric acid to the leaching circuit, which is undesirable in view of the fact that the circuit is a closed circuit where the acid requirement for dissolving the zinc content shall be balanced by the acid produced in the metal precipitation process in the electrolysis stage.

BRIEF DESCRIPTION OF THE FIGURE

FIG. 1 is a schematic, plan view of a preferred system for the total precipitation of valuable metals from a leaching solution acidified by sulphuric acid that is essentially free from impurities and contaminants, by neutralizing the solution with lime and/or limestone.

DESCRIPTION OF THE INVENTION

It has now surprisingly been found possible to provide a method for the total precipitation of said valuable metal content in the absence of the aforedescribed drawbacks. The method is characterised by the features set forth in the accompanying claims.

According to the inventive method, total precipitation of the valuable metal content of the leaching solution by neutralisation is carried out in at least two stages, wherein only partial precipitation is effected in the first stage and total precipitation of the remaining valuable metal content is effected in the last stage by adding a surplus of neutralisation agent. A slurry of precipitate and remaining solid neutralisation agent formed in the neutralisation process in the last stage is returned to the first neutralisation stage, optionally after preceding re-dissolution in the incoming acid leaching solution, together with any further added neutralisation agent in an amount that attends to the partial precipitation of the valuable metal content. Pure metal hydroxide/gypsum precipitate formed from the neutralisation agent in the first stage is first de-watered and then removed from the process for winning of the metal content in some known manner. Neutralisation is suitably effected in the first stage by raising the pH to a value of 4–6, while neutralisation is suitably effected in the last stage by raising the pH to a value of 7–10.

The partial neutralisation may be effected in one or more stages upstream of the last stage. The important thing is that all valuable metal remaining in the leaching solution is precipitated in the last stage and that at least a part of the slurry or pulp from this last stage is returned to the first stage, as before mentioned, whereas other parts can be returned to possible intermediate neutralisation stages. In this regard, the amount of slurry returned to the first stage can be regulated by internal circulation in the last stage and/or by returning the slurry to possible intermediate stages and/or to an earlier process stage for purifying the leaching solution.

Separation can be facilitated by adding a flocculating agent to the slurry leaving the last neutralisation stage.

The invention will now be described in more detail and explained with reference to the accompanying drawing, which has the form of a flowchart that illustrates a preferred embodiment of the invention.

A sulphuric acid leaching solution deriving from a bioleaching process, for instance, and containing one or more valuable metals such as copper, nickel, zinc, cobalt, etc., and which has normally been purified in a preceding stage with respect to its possible iron and arsenic content and which will therefore normally have a pH of about 3–3.5 is delivered to a first precipitation stage for neutralisation with lime or limestone to a pH of between 4 and 6, wherewith part of the valuable metal content is precipitated in the form of hydroxide complexes (this process often being referred to as partial precipitation). Solution containing the remaining quantity of incoming valuable metal in the leaching solution is taken from a downstream thickening stage and neutralised in a second precipitation stage with more lime or limestone, until substantially all of the total remaining valuable metal content has precipitated out. This often means that the pH has been raised to a value of between 7 and 10. The resultant slurry is then thickened, wherewith a metal-free bleed can be taken from the process and passed to the recipient. The thickened slurry is returned to the two precipitation stages, the amount of slurry returned to the first stage being regulated so as not to exceed the predetermined pH value. The remainder of the thickened slurry is circulated internally in the last precipitation stage. When the system includes more than two precipitation stages, the remainder of the thickened slurry can be divided between these stages in a suitable manner.

The thickened slurry from the first precipitation stage is washed and filtered, and dirty filtrate and washing water are passed to the second precipitation stage for precipitation of any valuable metals that they may contain. The resultant pure metal precipitate and gypsum precipitate are removed from the process and worked up in some suitable known manner to recover their metal content, for instance by electrowinnning.

The inventive method thus results in a final metal hydroxide precipitate that is relatively free from lime, since precipitation is effected in two stages and because removal of the metal-containing product from the system is effected at a pH value at which lime or limestone is utilised to a high degree. It is preferred that the leaching solution delivered to the precipitation circuit will have the lowest possible iron (II) content, although this is not a necessary preference as any iron (II) remaining from an earlier iron precipitation stage will be oxidised quickly with air to form iron (III) in the second precipitation stage in which a high pH prevails.

Lime or limestone and return slurry from the second precipitation stage (and possibly also through a bottom outlet from the thickener 1) is/are passed to the first precipitation stage, so as to effect incomplete precipitation of the valuable metals. Slurry or pulp leaving the precipitation stage 1, said slurry or pulp having a pH of about 4–6 as earlier mentioned, is thickened preferably with the addition of a flocculating agent, so as to form a dense, easily filtered and easily wetted product free from unreacted lime or limestone. Filtrate and washing water are passed together to the precipitation stage 2, via the overflow from the thickening stage 1, for final total precipitation and separation of their metal content.

The overflow from the thickening stage 1 will be relatively turbid in the absence of a flocculating agent. This turbidity, however, is not critical in any way, since the overflow is passed into the second precipitation stage in which lime or limestone is added to achieve total metal precipitation. This may suitably be effected at pH 7–10 while aerating the slurry or pulp to oxidise any divalent iron present to a trivalent state.

Flocculating agent is added to the slurry leaving the precipitation stage 2, so as to obtain in the thickening stage an overflow which is free from metal and particles and which can be taken out as a bleed. The net production of the thickened slurry that contains metals in hydroxide form and also unreacted lime is returned to the first reactor in precipitation stage 1, where prevailing conditions are as acid as possible. Alternatively, these products or a part thereof are/is returned to the acid leaching solution before raising its pH, for instance in a preceding iron precipitation stage, so as to re-dissolve co-precipitates and unreacted lime deriving from the second precipitation stage. In this case, the solid products from the last precipitation stage are thus delivered to the first precipitation stage present in a dissolved state in the ingoing leaching solution. A certain percentage of the slurry may be recycled internally in precipitation stage 2, with the intention of improving crystallisation in the precipitation process.

The final valuable metal precipitate leaving the thickener in precipitation stage 1 is removed from the system for phase separation and metal winning, for instance by means of a filtration process that includes a number of washing stages for contraflow washing process in thickeners (CCD).

The inventive method affords a large number of advantages over known technology, such as maximum utilisation of added alkaline (lime or limestone)

minimum content of unreacted lime in the metal hydroxide end product minimum consumption of flocculating agent readily filtered and readily washed metal hydroxide/ gypsum precipitate with the minimum addition of flocculating agent.

What is claimed is:

1. A method for the precipitation of valuable metals from a leaching solution that has been acidified with sulphuric acid and that is substantially free from impurities, by neutralization with lime and/or limestone, comprising the steps of:

a) conducting the neutralization in at least two stages wherein only partial precipitation is effected in the first stage and wherein extensive precipitation of the remaining valuable metal content is effected in the last stage by adding a surplus of neutralization agent;

b) forming a slurry of precipitate, solid neutralization agent and leaching solution in the last stage of the neutralization process;

c) returning the slurry, formed in the last stage, to the first neutralization stage, wherein the amount of slurry returned together with neutralizing agent added to the first stage provides the partial precipitation of the valuable metal content;

d) forming precipitate in the first stage that contains valuable metal, but is substantially free from neutralization agent; and e) separating the valuable metal containing precipitate in the first stage that is substantially free from neutralization agent from a liquid effluent wherein the liquid effluent is passed to a subsequent neutralization stage.

2. A method according to claim 1, wherein the neutralization process in the first stage is conducted while increasing the pH to a value of 4–6.

3. A method according to claim 2, wherein the neutralization process in the last stage is conducted by raising the pH to a value of 7–10.

4. A method according to claim 3, wherein the partial precipitation process is conducted in several stages.

5. A method according to claim 4, wherein the amount of slurry returned to the first stage is regulated by circulating a portion of the slurry to at least one stage following the first stage.

6. A method according to claim 5, wherein flocculating agent is added to the slurry leaving the last neutralization stage.

7. A method according to claim 1, wherein the neutralization process in the last stage is carried out by raising the pH to a value of 7–10.

8. A method according to claim 7, wherein the partial precipitation process is carried out in several stages.

9. A method according to claim 2, wherein the partial precipitation process is carried out in several stages.

10. A method according to claim 1, wherein the partial precipitation process is carried out in several stages.

11. A method according to claim 3, wherein the amount of slurry returned to the first stage is regulated by circulating a portion of the slurry to at least one stage following the first stage.

12. A method according to claim 2, wherein the amount of slurry returned to the first stage is regulated by circulating a portion of the slurry to at least one stage following the first stage.

13. A method according to claim 1, wherein the amount of slurry returned to the first stage is regulated by circulating a portion of the slurry to at least one stage following the first stage.

14. A method according to claim 4, wherein flocculating agent is added to the slurry leaving the last neutralization stage.

15. A method according to claim 3, wherein flocculating agent is added to the slurry leaving the last neutralization stage.

16. A method according to claim 2, wherein flocculating agent is added to the slurry leaving the last neutralization stage.

17. A method according to claim 1, wherein flocculating agent is added to the slurry leaving the last neutralization stage.

18. A method according to claim 1, wherein the returning slurry from the last neutralization stage is re-dissolved in the incoming acid leaching solution before entering the first stage.

* * * * *